US009013793B2

(12) United States Patent
Gupta et al.

(10) Patent No.: US 9,013,793 B2
(45) Date of Patent: Apr. 21, 2015

(54) LIGHTWEIGHT EYEPIECE FOR HEAD MOUNTED DISPLAY

(75) Inventors: Anurag Gupta, Los Gatos, CA (US); Babak Amirparviz, Mountain View, CA (US); Sumit Sharma, San Jose, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/239,041

(22) Filed: Sep. 21, 2011

(65) Prior Publication Data

US 2013/0070338 A1    Mar. 21, 2013

(51) Int. Cl.
*G02B 27/28* (2006.01)
*G02B 27/01* (2006.01)
*G02B 5/30* (2006.01)
*F21V 8/00* (2006.01)

(52) U.S. Cl.
CPC .............. *G02B 27/0172* (2013.01); *G02B 5/30* (2013.01); *G02B 6/0035* (2013.01)

(58) Field of Classification Search
CPC .......... G02B 27/0103; G02B 27/0172; G02B 27/0149; G02B 27/0101; G02B 27/017; G02B 5/3058; H04N 9/3197; G06T 19/00; G06T 19/006; G06T 19/19006
USPC ......... 359/242, 485.05, 489.08, 13, 630, 632; 345/7, 8, 419, 633
See application file for complete search history.

(56) References Cited

U.S. PATENT DOCUMENTS 4,711,512 A   12/1987 Upatnieks
5,076,664 A   12/1991 Migozzi
5,093,567 A   3/1992 Staveley
5,539,422 A   7/1996 Heacock et al.
5,696,521 A * 12/1997 Robinson et al. ............... 345/8
(Continued)

FOREIGN PATENT DOCUMENTS

GB    2272980 A         6/1994
JP    2007-156096   *   6/2007   ............. G02B 27/02
(Continued)

OTHER PUBLICATIONS

Englisg translation of JP 2007-156096, translated on Mar. 28, 2013.*

(Continued)

*Primary Examiner* — James Greece
*Assistant Examiner* — Jie Lei
(74) *Attorney, Agent, or Firm* — Blakely Sokoloff Taylor & Zafman LLP

(57) ABSTRACT

An eyepiece includes an eyepiece frame, an in-coupling polarization beam splitter ("PBS"), an end reflector, and an out-coupling PBS. The eyepiece frame defines an air cavity and includes an illumination region for receiving computer generated image ("CGI") light into the eyepiece frame and a viewing region to be aligned with an eye of a user. The in-coupling PBS is supported within the eyepiece frame at the illumination region to re-direct the CGI light to a forward propagation path extending along the air cavity towards the viewing region. The end reflector is disposed to reflect the CGI light back along a reverse propagation path within the eyepiece frame. The out-coupling PBS is supported at the viewing region to pass the CGI light traveling along the forward propagation path and to redirect the CGI light traveling along the reverse propagation path out of an eye-ward side of the eyepiece frame.

23 Claims, 7 Drawing Sheets

(56) References Cited

U.S. PATENT DOCUMENTS

| | | |
|---|---|---|
| 5,771,124 A | 6/1998 | Kintz et al. |
| 5,815,126 A | 9/1998 | Fan et al. |
| 5,844,530 A | 12/1998 | Tosaki |
| 5,886,822 A * | 3/1999 | Spitzer ............... 359/630 |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,043,591 A * | 3/2000 | Gleckman ............... 313/110 |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,335,838 B1 * | 1/2002 | Kasai et al. ............... 359/834 |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,693,749 B2 * | 2/2004 | King et al. ............... 359/630 |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 6,880,931 B2 | 4/2005 | Moliton et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0007672 A1 | 1/2005 | Wu |
| 2005/0174651 A1 | 8/2005 | Spitzer et al. |
| 2005/0219152 A1 | 10/2005 | Budd et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2008/0241537 A1 * | 10/2008 | Sennett et al. ............... 428/394 |
| 2009/0122414 A1 | 5/2009 | Amitai |
| 2010/0046070 A1 | 2/2010 | Mukawa |
| 2010/0079356 A1 * | 4/2010 | Hoellwarth ............... 345/8 |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0213664 A1 | 9/2011 | Osterhout et al. |

FOREIGN PATENT DOCUMENTS

| | | | |
|---|---|---|---|
| JP | 2007-156096 A1 | 6/2007 | |
| WO | WO 96/05533 A1 | 2/1996 | |
| WO | WO 2009/136393 | * 12/2009 | ............ G02B 27/01 |

OTHER PUBLICATIONS

PCT/US2012/046372; PCT International Search Report and Written Opinion of the International Searching Authority, mailed Jan. 25, 2013, 11 pages.

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

PCT/US2012/046372; PCT International Preliminary Report on Patentability, mailed Apr. 3, 2014, 8 pages.

* cited by examiner

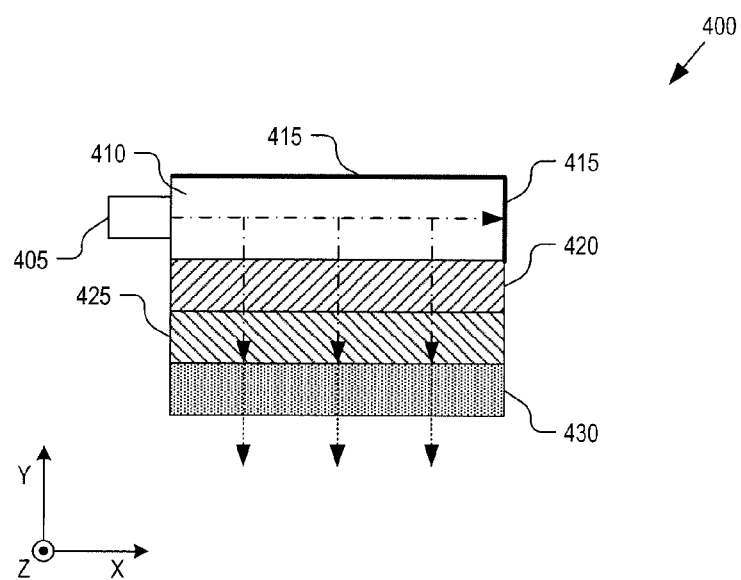
FIG. 4
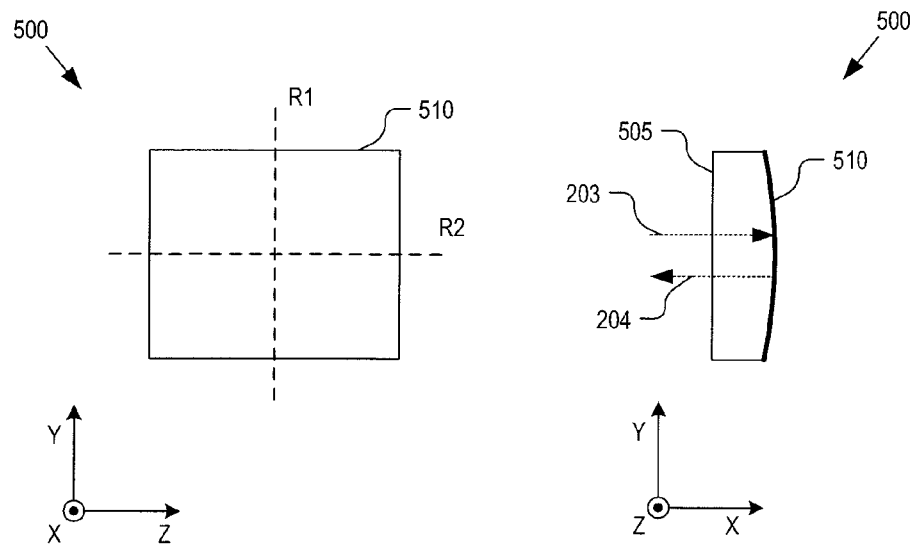
FIG. 5A  FIG. 5B

US 9,013,793 B2

LIGHTWEIGHT EYEPIECE FOR HEAD MOUNTED DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4 is a cross-sectional view of an illumination module of an eyepiece, in accordance with an embodiment of the disclosure.

FIGS. 5A & 5B illustrate cross-sectional views of an end reflector of an eyepiece, in accordance with an embodiment of the disclosure.

DETAILED DESCRIPTION

Embodiments of a system, apparatus, and method of operation for a head mounted display ("HMD") eyepiece. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
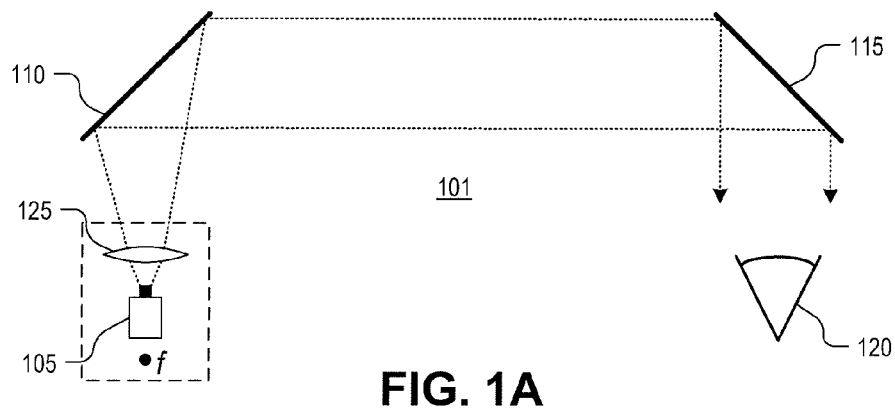
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to their eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a relatively small field of view limited by the extent of mirrors 110 and 115 and the bulkiness of lens 125. The field of view can be marginally improved by placing minors 110 and 115 within a high index material to compress the angles of incidence, but the thickness of the waveguide rapidly increases to achieve larger fields of view.

Figure 1B:
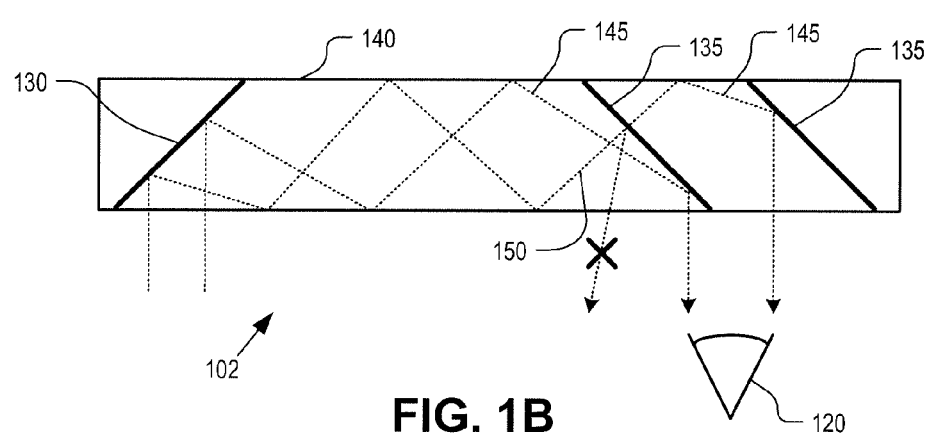
FIG. 1B illustrates a second conventional near-to-eye optical system using angle sensitive dichroic minors.

FIG. 1B illustrates a second conventional near-to-eye optical system 102 using angle sensitive dichroic mirrors. Optical system 102 includes a single in-coupling mirror 130 and two out-coupling dichroic mirrors 135 disposed within a waveguide 140. This system uses collimated input light from virtual images placed at infinity and uses total internal reflection ("TIR") to guide the input light down waveguide 140 towards out-coupling dichroic mirrors 135. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others, limits the field of view of optical system 102 and reduces the optical efficiency of the system. In addition, these dichroic mirror coatings do not provide sharp angular cutoffs, resulting in ghosting effects.

The angle sensitive dichroic mirror coating requires a complicated and customized coating design, which is not cost effective.

Figure 1C:
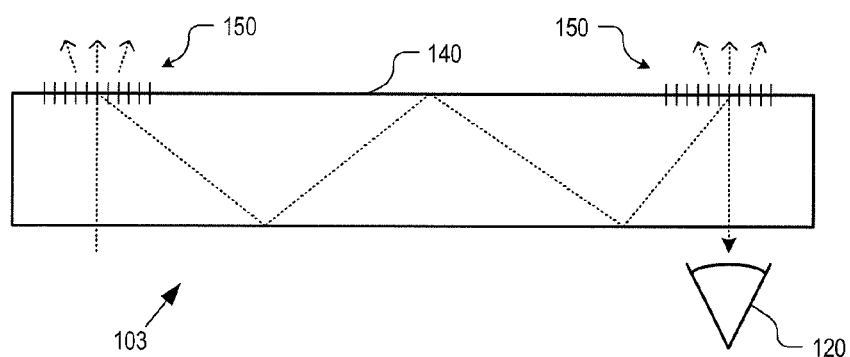
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly.

Figure 2:
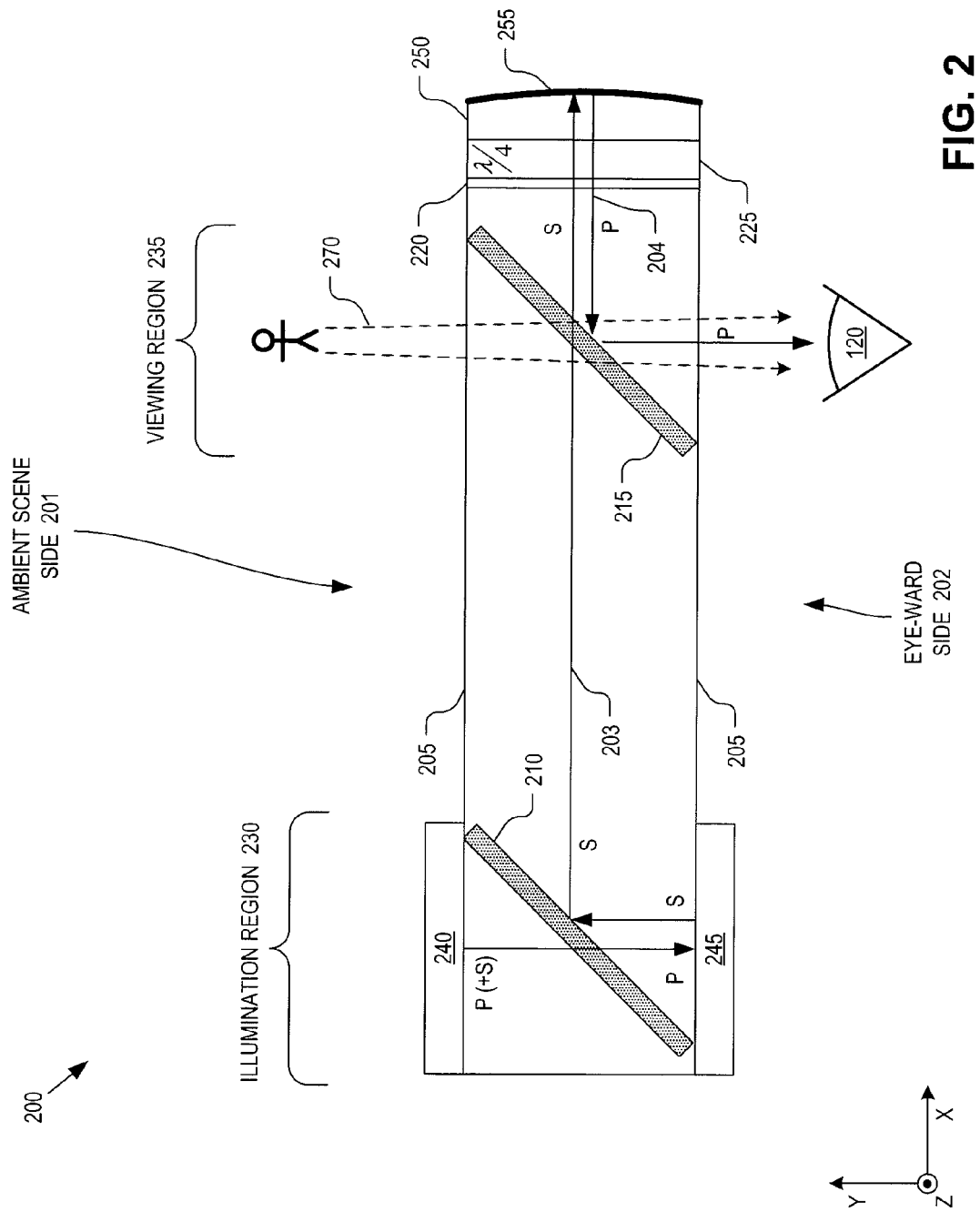
FIG. 2 is a cross-sectional view of an eyepiece, in accordance with an embodiment of the disclosure.
Figure 3:
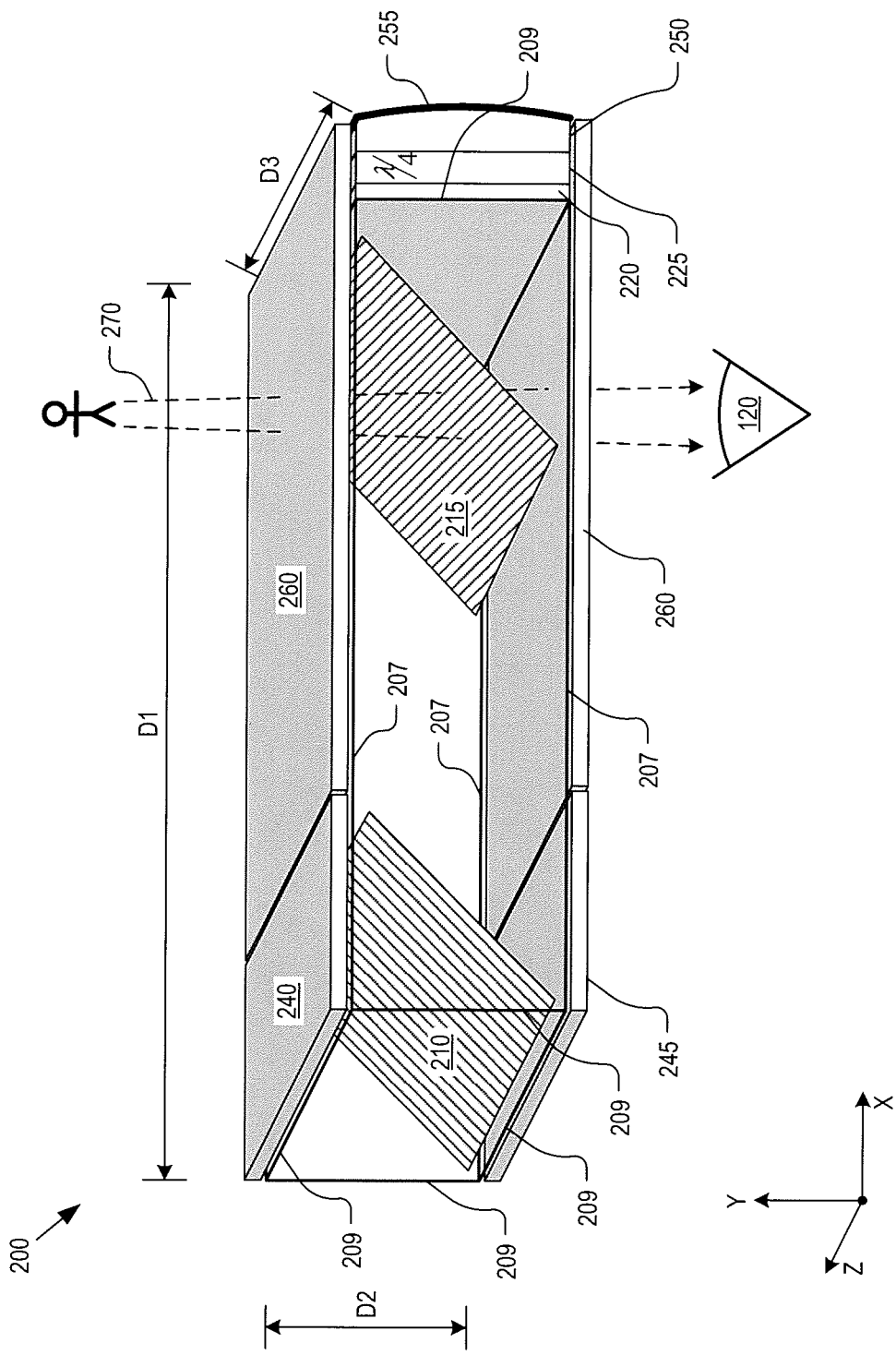
FIG. 3 is a perspective view of an eyepiece, in accordance with an embodiment of the disclosure.

FIGS. 2 and 3 illustrate an eyepiece 200 for use with a HMD, in accordance with an embodiment of the disclosure. FIG. 2 illustrates a cross-sectional view of eyepiece 200 while FIG. 3 illustrates a perspective view of the same. The illustrated embodiment of eyepiece 200 includes an eyepiece frame 205, an image source, an in-coupling polarizing beam splitter ("PBS") 210, an out-coupling PBS 215, a transparent plate 220, a polarization rotator 225, and an end reflector. The illustrated embodiment of eyepiece frame 205 includes an illumination region 230 and a viewing region 235. The illustrated embodiment of the image source includes illumination module 240 and display panel 245. The illustrated embodiment of the end reflector includes a convex lens 250 and a reflective layer 255. Referring to FIG. 3, in one embodiment, eyepiece 200 further includes transparent side sheets 260.

In one embodiment, eyepiece frame 205 defines an air cavity and holds the internal components in place. In the illustrated embodiment, in-coupling PBS 210 and out-coupling PBS 215 are mounted within eyepiece frame 205 at oblique angles (e.g., 45 degrees) to forward propagation path 203. Forward propagation path 203 extends within eyepiece frame 205 from illumination region 230 to viewing region 235. In the embodiment illustrated in FIG. 3, frame 205 includes elongated members 207 and cross-members 209. Cross-members 209 coupled between pairs of elongated members 207 to rigidly support the frame. In one embodiment, forward propagation path 203 is substantially parallel with elongated members 207 and substantially perpendicular to cross-members 209. Eyepiece frame 205 may be fabricated of metal (e.g., magnesium metal) and may be further fabricated as a rigid metal wire frame. In some embodiments, protective sheathing layers (e.g., transparent side sheets 260; note: only two are illustrated but all four sides may be sheathed for protection) may be fixed onto eyepiece frame 205 to protect the inner components. The protective sheathing may be transparent (e.g., glass, quartz, acrylic, clear plastic, PMMA, ZEONEX—E48R, etc.) in viewing region 235 to permit ambient scene light 270 to pass through ambient scene side 201 and eye-ward side 202 of eyepiece 200 to reach eye 120. The semi-transparent nature of viewing region 235 permits eyepiece 200 to provide an augmented reality to the user by augmenting ambient scene light 270 with the CGI light.

Illumination module 240 may be implemented using a light emitting diode ("LED") source (or multi-color LED array), which illuminates display panel 245 through in-coupling PBS 210. Illumination module 240 may output unpolarized light (e.g., both P and S linear polarization components) or output polarized light (e.g., just P polarization component). Illumination module 240 and display panel 245 may be mounted to the outer side of frame 205 in the illumination region 230 in an opposing configuration on either side of eyepiece 200.

In-coupling PBS 210 is positioned within illumination region 230 between illumination module 240 and display panel 245. In-coupling PBS 210 may be implemented as a wire grid polarizer, a multi-layer thin film polarizer, or otherwise. In-coupling PBS 210 operates to substantially pass light of a first linear polarization while substantially reflecting light of a second polarization. The two linear polarizations are typically orthogonal linear polarizations. Display panel 245 (e.g., LCOS, LCD panel, etc.) imparts image data onto the illumination light output by illumination module 240 to output computer generated image ("CGI") light via selective reflection by an array of image pixels. Reflection by display panel 245 rotates the polarization of the incident lamp light by 90 degrees.

Upon reflection of the incident lamp light, the CGI light (which has been rotated in polarization by 90 degrees) is re-directed by in-coupling PBS 210 and propagates down eyepiece 200 along forward propagation path 203. In one embodiment, the CGI light is directed down eyepiece 200 along forward propagation path 203 without need of total internal reflection ("TIR"). In other words, the cross sectional shape and divergence of the light cone formed by the CGI light is confined such that the light rays reach the end reflector without TIR off the sides (e.g., transparent side sheets 260) of eyepiece 200. In one embodiment, the light cone divergence angle (e.g., 15 degrees) is controlled by a blackout film patterned onto illumination module 240, display panel 245, or elsewhere within eyepiece frame 205.

Forward propagation path 203 extends through the air cavity within eyepiece frame 205 to reflective layer 255. The air cavity protected by eyepiece frame 205 operates as a lightweight light relay to protect the optical path. In one embodiment, the length of elongated members 207 is selected such that the focal plane of the end reflector substantially coincides with an emission aperture of display panel 245. To achieve focal plane alignment with the emission aperture of display panel 245, both the length of eyepiece frame 205 and the radius of curvature of reflective layer 255 may be selected in connection with each other.

The illustrated embodiment of viewing region 235 includes a reflective surface formed by out-coupling PBS 215. In one embodiment, viewing region 235 is partially transparent, which permits external (ambient) scene light 270 to pass through external scene side 201 and eye-ward side 202 of eyepiece 200 to reach eye 120. A partially transparent embodiment facilitates an augmented reality ("AR") where the CGI light is superimposed over external scene light 270 to the user eye 120. In another embodiment, viewing region 235 is substantially opaque (or even selectively opaque), which facilitates a virtual reality ("VR") that immerses the user in the virtual environment displayed by the CGI light.

Out-coupling PBS 215 is configured to pass an orthogonal linear polarization (e.g., S polarization) than in-coupling PBS 210 passes, while reflecting the other linear polarization (e.g., P polarization). In-coupling PBS 210 may be implemented as a wire grid polarizer (see FIGS. 6A and 6B), a multi-layer thin film polarizer, or otherwise. In the illustrated embodiment, polarization rotator 225 is a quarter wave-plate polarization rotator sandwiched between transparent plate 220 and convex lens 250 to eliminate deformities in the quarter wave plate's film embodiment and to allow for an antireflection coating of the optics past out-coupling PBS 215 into the end reflector. The CGI light is rotated 90 degree in polarization during its double pass through the quarter wave plate via forward propagation path 203 and reverse propagation path 204 after reflection by reflective layer 225. In one embodiment, the end reflector, which includes convex lens 250 and reflective layer 255, both reflects and collimates the CGI light such that the CGI light traveling along reverse propagation path 204 is substantially collimated. As previously stated, the focal plane of the end reflector may be configured to coincide or nearly coincide with the emission aperture of display panel 245. Collimating the CGI light helps eye 120 to focus on the CGI light emitted out eye-ward side 202 in a near-to-eye configuration (e.g., eyepiece 200 placed within 10 cm of eye 120 and typically less than 5 cm of eye 120). The CGI light is directed towards eye 120 due to the oblique orientation (e.g., approximately 45 degrees relative to sides 201 and 202) of out-coupling PBS 215. In other embodiments, the end reflector reduces the divergence of the CGI light without fully collimating the CGI light. In yet other embodiments, the end reflector may be implemented as a flat reflective surface.

In an embodiment where the end reflector collimates the CGI light, the eyebox (the zone within which eye 120 can see the CGI light) is determined by the projection of out-coupling PBS 215 onto eye-ward side 202. The size of out-coupling PBS 215 is confined by the cross-sectional size and shape of eyepiece 200. Referring to FIG. 3, in one embodiment, eyepiece 200 may have example cross-sectional dimensions D2=D3=10 mm. In other embodiments, dimensions D2 and D3 need not be equivalent (e.g., D2=10.2 mm and D3=7.7 mm). The overall length D1 of eyepiece 200 may be selected based upon the temple-to-eye separation distance of a typical user and/or the focal plane distance of the end reflector. For example, the end reflector may have a radius of curvature approximately equal to 80 mm and eyepiece 200 may have a length D1 approximately equal to 29.5 mm. Of course other ratios and dimensions may be used.

FIG. 4 is a cross-sectional view of an illumination module 400, in accordance with an embodiment of the disclosure. Illumination module 400 represents one possible implementation of illumination module 240 illustrated in FIGS. 2 and 3. The illustrated embodiment of illumination module 400 includes a lamp 405, a light expansion zone 410, reflective surfaces 415, brightness enhancement films ("BEFs") 420 and 425, and a polarizer 430.

Lamp 405 may be implemented as a single color LED, a multi-color array (e.g., RGB) of LEDs, or other light sources mounted to the side of light expansion zone 410. The light emitted from lamp 405 illuminates expansion zone 410, which uniformly spreads the light out over a larger cross-section. In embodiment, expansion zone 410 is implemented as a transparent polymer volume with reflective surfaces 415 (e.g., metal coatings) on its exposed sides. Expansion zone 410 is disposed on two stacked BEFs 420 and 425. These films have optical power and operate to reduce the divergence of the lamp light. In one embodiment, BEFs 420 and 425 are micro-prism layers that are rotated 90 degrees relative to each other. In the illustrates embodiment, the stack of BEFs 420 and 425 is disposed on a polarizer 430, which operates to polarize the lamp light into a single linear polarization component (e.g., P polarization) for illuminating display panel 245 through in-coupling PBS 210. Thus, polarizer 430 is configured to output light having a polarization component to which in-coupling PBS 210 is substantially transparent. In one embodiment, components 410, 420, 425, and 430 are clamped together without using glue.

FIGS. 5A & 5B illustrate cross-sectional views of an end reflector 500, in accordance with an embodiment of the disclosure. End reflector 500 is one possible implementation of the end reflector illustrated in FIGS. 2 and 3. The illustrated embodiment of end reflector 500 includes a convex lens 505 and a concave reflector 510 coated over the convex end of convex lens 505. Convex lens 505 is fabricated of a substantially transparent material (e.g., glass, quartz, acrylic, clear plastic, polycarbonate, PMMA, ZEONEX—E48R, etc.). Concave reflector 510 is made of a reflective material (e.g., metal coating) disposed over convex lens 505. In an embodiment where eyepiece frame 205 defines an air cavity and forward propagation path 203 passes through a combination of air and solid surfaces (e.g., in-coupling PBS 210, out-coupling PBS 215, transparent plate 220, polarization rotator 225, and convex lens 250), concave reflector 510 may be a toroidal mirror having two different radiuses of curvature R1 and R2 to correct for an astigmatism optical aberration. For example, R1 may be approximately 81.87 mm and R2 may be approximately 83.20 mm. Of course, other radius combinations may be used. In other embodiments, eyepiece 200 may be fabricated as a solid piece with the in-coupling and out-coupling PBS s embedded therein. In other embodiments, the end reflector may be fabricated as a simple concave mirror without a convex lens. Furthermore, concave reflector 510 may be an aspheric surface, a free form surface, or otherwise.

Figure 6A:
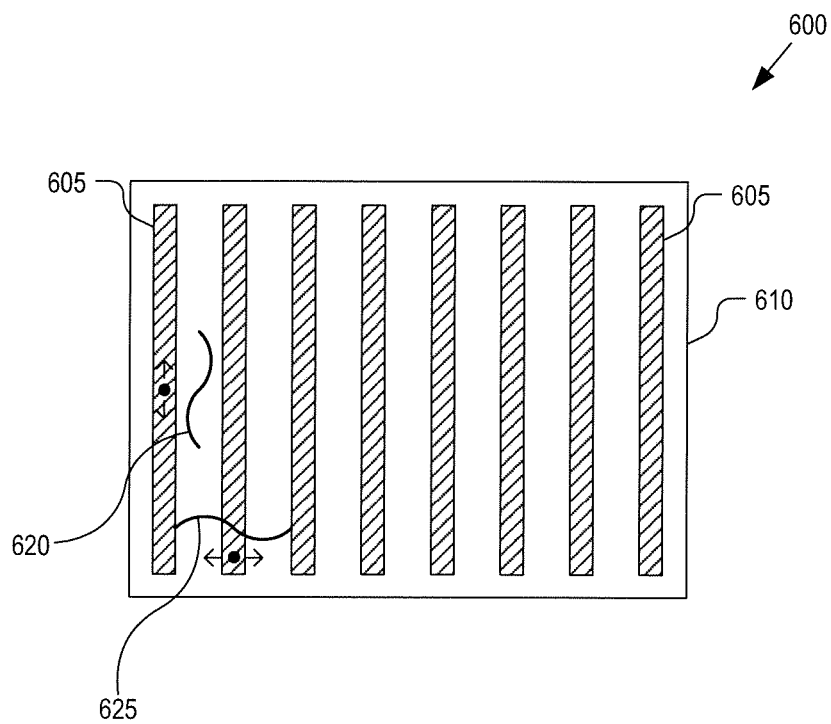
FIGS. 6A & 6B illustrate front and side views of a wire grid polarizer, in accordance with an embodiment of the disclosure.
Figure 6B:
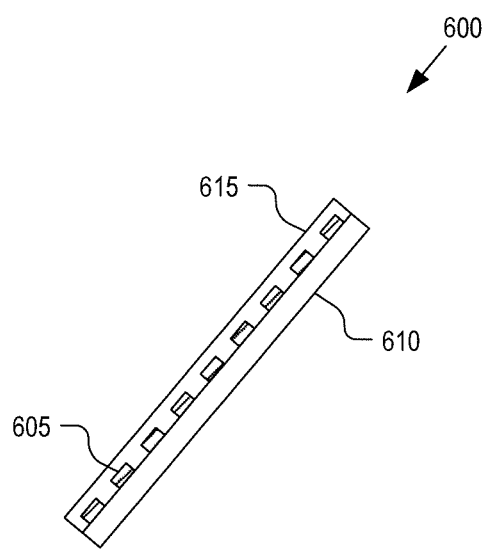

FIGS. 6A & 6B illustrate front and side views of a wire grid polarizer ("WGP") 600, in accordance with an embodiment of the disclosure. WGP 600 represents one possible implementation of either or both in-coupling PBS 210 and/or out-coupling PBS 215. The illustrated embodiment of WGP 600 includes a plurality of metal lines 605 (or wires) that run substantially parallel to each other. In one embodiment, metal lines 605 are disposed on substrate 610, which may be a clear or transparent substrate. In one embodiment, metal lines 605 may be embedded within substrate 610 or covered over by a protective layer 615. Metal lines 605 may be fabricated of aluminum, tin, copper, or other conductive material. Substrate 610 (and protective layer 615) may be fabricated of glass, quartz, acrylic, or other transparent materials such as Zeonex, PMMA, polycarbonate, etc. In some embodiments, substrate 610 may include one or more optical filter coatings (e.g., antireflective coatings, color coatings, darkening coatings, or otherwise). The pitch between adjacent metal lines 605 is generally selected to be below the wavelength(s) to be polarized. As a mere example, the pitch may be selected to be about 100 nm, while the thickness of metal lines 605 may be selected to be about 30 nm. Of course, other pitches and thickness may be selected according to the application and desired polarization characteristics.

During operation, when WGP 600 is illuminated with an unpolarized light, including components having a first linear polarization 620 and components having a second linear polarization 625, the components having polarization 620 are substantially reflected while the components having polarization 625 pass through substantially unaffected. The electric field of linear polarization 620 excites electrons vertically along the length of metal lines 605, which results in these components being radiated along a reflection path. In contrast, the electric field of polarization 625 excites electrons laterally across metal lines 605. Since the electrons within metal lines 605 are confined horizontally, the components with polarization 625 pass through metal lines 605. Of course, if WGP 600 is illuminated with polarized light substantially only having polarization 625, then the light will substantially pass through. In contrast, if WGP 600 is illuminated with polarized light having substantially just polarization 620, then the light will substantially reflect. In the illustrated embodiment, linear polarization 620 is orthogonal to linear polarization 625.

The degree to which polarized light passes through WGP 600, or is reflected thereby, is a function of at least the wavelength of the incident light and the grid pitch between metal lines 605. Furthermore, by rotating WGP 600 relative to the input light (e.g., relative to CGI light), then WGP 600 can be made to pass or reflect either P or S polarization. Thus, in one embodiment, both in-coupling PBS 210 and out-coupling PBS 215 are fabricated with WGPs mounted within eyepiece frame 205 with orthogonal orientations (e.g., 90 degree relative physical orientations of the wire lines in the wire grid polarizers) thereby avoiding the need for a half-wave-plate polarization rotator disposed between in-coupling PBS 210 and out-coupling PBS 215. In one embodiment, just in-coupling PBS 210 is fabricated using a WGP, while out-coupling PBS 215 is fabricated using a multi-layer thin film PBS, with the WGP at the in-coupling location oriented to pass an orthogonal polarization relative to out-coupling PBS 215.

Figure 7:
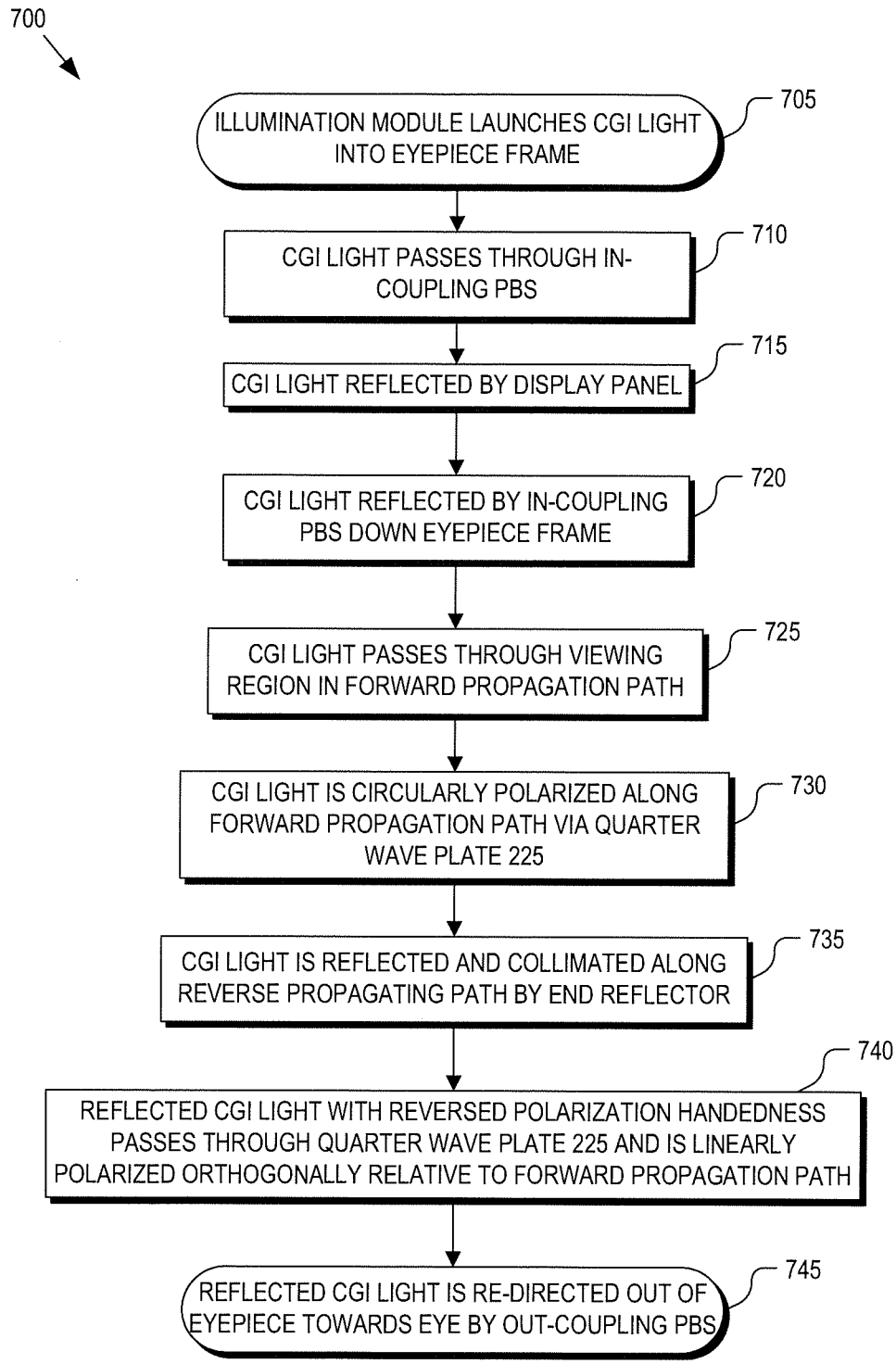
FIG. 7 is a flow chart illustrating a process of operation of an eyepiece to deliver a near-to-eye image to a user, in accordance with an embodiment of the disclosure.

FIG. 7 is a flow chart illustrating a process 700 of operation of eyepiece 200 to deliver a near-to-eye image to a user, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In a process block 705, illumination module 240 emits lamp light being either unpolarized or having first a first linear polarization (e.g., illustrated as P polarization) selected to pass through in-coupling PBS 210. Upon passing through in-coupling PBS 210 (process block 710), unpolarized light becomes polarized prior to illuminating display panel 245. Display panel 245 modulates image data onto the incident lamp light by selectively activating image pixels within the display panel. When an image pixel is activated, it reflects its portion of the lamp light (process block 715). In so doing, the reflected CGI light has its polarization rotated by 90 degrees to a polarization that is reflected by in-coupling PBS 210 (e.g., illustrated as S polarization). The CGI light emitted from display panel 245 is reflected back onto in-coupling PBS 210, which re-directs the CGI light along forward propagation path 203 (process block 720). It should be appreciated that the designation of P and S polarizations, whereby P is transmitted and S is reflected is merely demonstrative. Other polarization orientations and transmitted/reflected combinations may be implemented.

The re-directed CGI light propagates down eyepiece frame 205 within the air cavity. In one embodiment, the length of eyepiece frame 205 merely provides a separation offset between the image source and the end reflector and need not operate to confine or guide the light wave. Thus, in these embodiments, the CGI light passes down eyepiece 200 without TIR and without external surface reflections. In a process block 725, the CGI light passes through viewing region 235 along forward propagation path 203. Since out-coupling PBS 215 is configured to substantially pass the same polarization component as reflected by in-coupling PBS 210 (i.e., in-coupling PBS 210 and out-coupling PBS 215 reflect orthogonal polarization components and transmit orthogonal polarization components relative to each other), the CGI light passes through out-coupling PBS 215 substantially without being affected.

In a process block 730, the CGI light then passes through polarization rotator 225 along forward propagation path 203. In so doing, the polarization of the CGI light is circularly polarized since the illustrated embodiment of polarization rotator 225 is a quarter wave-plate rotator.

In a process block 735, the CGI light is reflected back along reverse propagation path 204 by reflective layer 255. In one embodiment, reflective layer 255 is concave and has a shape to substantially collimate the CGI light reflected along reverse propagation path 204. Collimating the CGI light has an effect of virtually displacing the CGI image at or near infinity thereby helping the human eye 120 to bring the CGI image into focus. Of course, the end reflector may reduce the divergence without fully collimating the light, thereby displacing the virtual image at a location less than infinity (e.g., 1 to 3 meters).

In a process block 740, the reflected CGI light traveling along reverse propagation path 204 once again passes through polarization rotator 225, causing the reversed circularly polarized CGI light to be linearly polarized at an orthogonal direction of polarization to the forward path. Thus, after passing through polarization rotator 225 for the second time, the CGI light has a polarization that is substantially reflected by out-coupling PBS 215 (e.g., illustrated as P polarization). In a process block 745, the CGI light is reflected by out-coupling PBS 215 and redirected out of eyepiece 200 through eye-ward side 202 towards eye 120.

Figure 8:
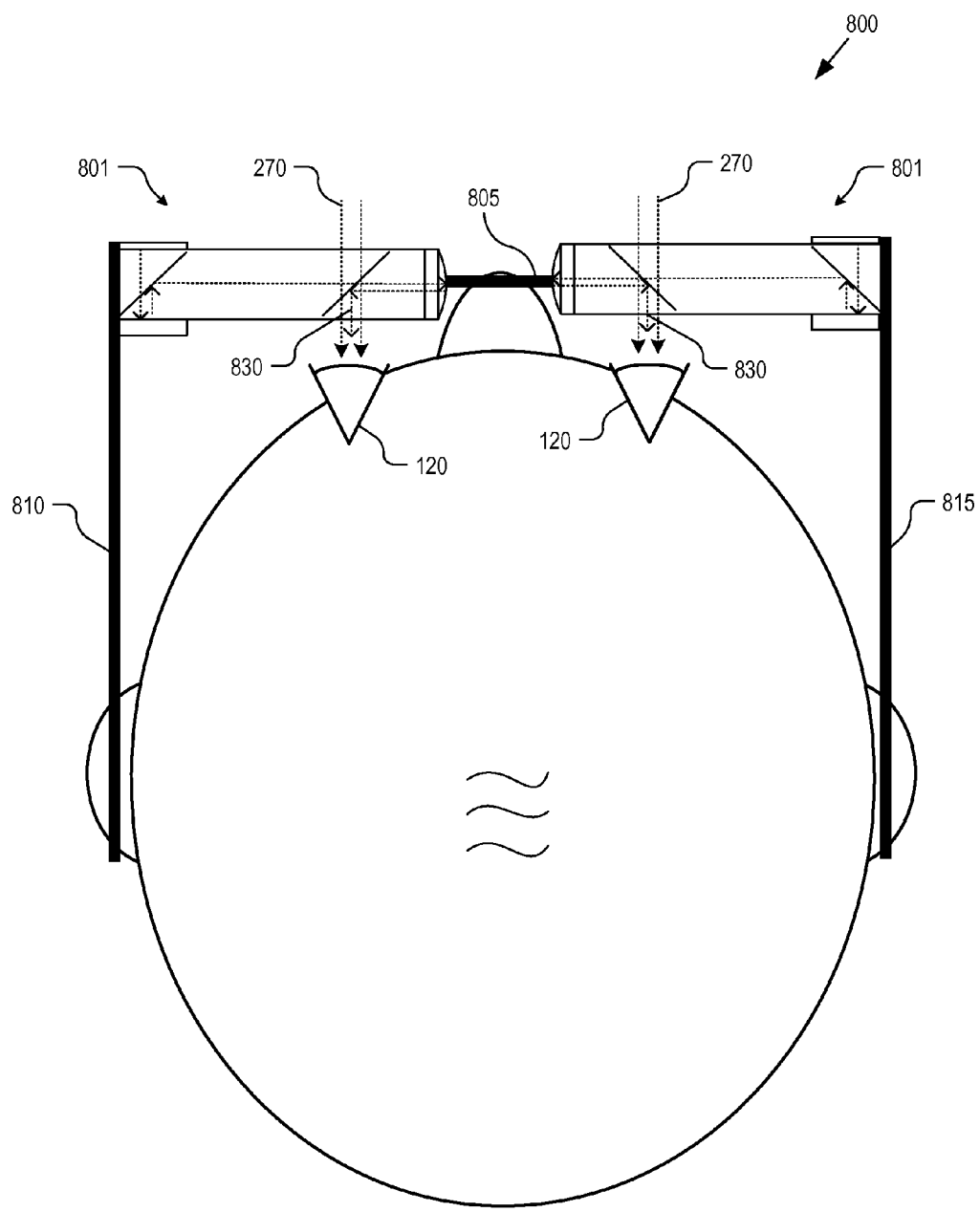
FIG. 8 is a top view of a binocular HMD implemented with eyepieces, in accordance with an embodiment of the disclosure.

FIG. 8 is a top view of a head mounted display ("HMD") 800 using a pair of near-to-eye optical systems 801, in accordance with an embodiment of the disclosure. Each near-to-eye optical system 801 may be implemented with embodiments of eyepiece 200. The near-to-eye optical systems 801 are mounted to a frame assembly, which includes a nose bridge 805, left ear arm 810, and right ear arm 815. Although FIG. 8 illustrates a binocular embodiment, HMD 800 may also be implemented as a monocular HMD with only a single eyepiece.

The two near-to-eye optical systems 801 are secured into an eyeglass arrangement that can be worn on the head of a user. The left and right ear arms 810 and 815 rest over the user's ears while nose assembly 805 rests over the user's nose. The frame assembly is shaped and sized to position a viewing region 235 in front of a corresponding eye 120 of the user. Of course, other frame assemblies having other shapes may be used (e.g., a visor with ear arms and a nose bridge support, a single contiguous headset member, a headband, goggles type eyewear, etc.).

The illustrated embodiment of HMD 800 is capable of displaying an augmented reality to the user. The viewing region of each eyepiece permits the user to see a real world image via external scene light 270. Left and right (binocular embodiment) CGI light 830 may be generated by one or two CGI engines (not illustrated) coupled to a respective image source of the eyepieces. CGI light 830 is seen by the user as virtual images superimposed over the real world as an augmented reality. In some embodiments, external scene light 270 may be blocked or selectively blocked to provide a head mounted virtual reality display or heads up display.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
    an eyepiece frame defining an air cavity, the eyepiece frame including an illumination region for receiving computer generated image ("CGI") light into the eyepiece frame and a viewing region to be aligned with an eye of a user;
    an in-coupling polarization beam splitter ("PBS") supported within the eyepiece frame at the illumination region to re-direct the CGI light to a forward propagation path extending along the air cavity towards the viewing region;
    a reflector disposed at an opposite end of the eyepiece frame from the illumination region to reflect the CGI light back along a reverse propagation path within the eyepiece frame, wherein the reflector comprises a toroidal mirror having multiple radiuses of curvatures;
    out-coupling PBS supported within the eyepiece frame at the viewing region to pass the CGI light traveling along the forward propagation path and to redirect the CGI light traveling along the reverse propagation path out of an eye-ward side of the eyepiece frame, wherein the out-coupling PBS reflects a substantially orthogonal polarization component of the CGI light than the in-coupling PBS reflects; and
    a polarization rotator disposed in the forward and reverse propagation paths of the CGI light between the out-coupling PBS and the reflector,
    wherein the toroidal mirror is disposed in the forward propagation path after the polarization rotator and the out-coupling PBS with the polarization rotator disposed between the toroidal mirror and the out-coupling PBS.

2. The eyepiece of claim 1, wherein the eyepiece frame comprises a metal frame including:
    elongated members that extend from the illumination region to the viewing region and run substantially parallel to the forward propagation path; and
    cross members that rigidly hold the elongated members together.

3. The eyepiece of claim 2, wherein the metal frame comprises a magnesium metal frame.

4. The eyepiece of claim 2, further comprising:
    substantially transparent side sheets mounted to the metal frame to protect components internal to the metal frame, wherein the eyepiece passes ambient scene light through an ambient scene side and the eye-ward side of the eyepiece in the viewing region to augment the ambient scene light with the CGI light.

5. The eyepiece of claim 4, wherein the substantially transparent side sheets comprises sheets of plastic.

6. The eyepiece of claim 1, wherein the in-coupling PBS comprises a first wire grid polarizer.

7. The eyepiece of claim 6, wherein the out-coupling PBS comprises a second wire grid polarizer, wherein wire lines of the second wire grid polarizer are orientated to run substantially orthogonal to wire lines of the first wire grid polarizer.

8. The eyepiece of claim 6, wherein the out-coupling PBS comprises a thin film polarizer that reflects a substantially orthogonal polarization component of the CGI light than the first wire grid polarizer reflects.

9. The eyepiece of claim 1, further comprising:
    an illumination module disposed at the illumination region; and
    a reflective display panel disposed at the illumination region for generating the CGI light in response to illumination by the illumination module,
    wherein the reflective display panel is disposed on an opposite side of the eyepiece from the illumination module in the illumination region with the in-coupling PBS disposed between the illumination module and the reflective display panel.

10. The eyepiece of claim 9, wherein the illumination module comprises:
    a transparent expansion volume;
    a light emitting diode mounted to a side of the transparent expansion volume to illuminate the transparent expansion volume with lamp light;
    a first bright enhancement film ("BEF") disposed adjacent to the transparent expansion volume to reduce divergence of the lamp light along a first axis;
    a second BEF disposed adjacent to the first BEF to reduce the divergence of the lamp light along a second axis; and
    a polarizer disposed between the second BEF and the in-coupling PBS.

11. The eyepiece of claim 1, wherein the reflector comprises a concave mirror coated onto a surface of a convex lens.

12. A head mounted display ("HMD") for displaying computer generated image ("CGI") light to an eye of a user, the HMD comprising:
    an eyepiece including:
        an eyepiece frame defining an air cavity, the eyepiece frame including an illumination region for receiving computer generated image ("CGI") light into the eyepiece frame and a viewing region to be aligned with an eye of a user;
        an image source mounted to the eyepiece frame at the illumination region for generating the CGI light;
        in-coupling polarization beam splitter ("PBS") supported within the eyepiece frame at the illumination region to re-direct the CGI light received from the image source to a forward propagation path extending along the air cavity towards the viewing region;
        an end reflector disposed at an opposite end of the eyepiece frame from the illumination region to reflect the CGI light back along a reverse propagation path within the eyepiece frame, wherein the end reflector comprises a toroidal mirror having multiple radiuses of curvatures; and
        out-coupling PBS supported within the eyepiece frame at the viewing region to pass the CGI light traveling along the forward propagation path and to redirect the CGI light traveling along the reverse propagation path out of an eye-ward side of the eyepiece frame, wherein the out-coupling PBS reflects a substantially orthogonal polarization component of the CGI light than the in-coupling PBS reflects, wherein the toroidal mirror is disposed in the forward propagation path after the out-coupling PBS; and
    a frame assembly to support the eyepiece for wearing on a head of the user with the viewing region positioned in front of the eye of the user.

13. The HMD of claim 12, wherein the HMD comprises a binocular HMD including another eyepiece supported by the frame assembly in front of another eye of the user.

14. The HMD of claim 12, wherein the eyepiece further includes:
    a polarization rotator disposed in the forward and reverse propagation paths of the CGI light between the out-coupling PBS and the toroidal mirror.

15. The HMD of claim 12, wherein the eyepiece frame comprises a metal frame including:

elongated members that extend from the illumination region to the viewing region and run substantially parallel to the forward propagation path; and cross-members that rigidly hold the elongated members together.

16. The HMD of claim 15, wherein the eyepiece further comprises:

substantially transparent side sheets mounted to the metal frame to protect components internal to the metal frame, wherein the eyepiece passes ambient scene light through an ambient scene side and the eye-ward side of the eyepiece in the viewing region to augment the ambient scene light with the CGI light.

17. The HMD of claim 12, wherein the in-coupling PBS comprises a first wire grid polarizer.

18. The HMD of claim 17, wherein the out-coupling PBS comprises a second wire grid polarizer, wherein wire lines of the second wire grid polarizer are orientated to run substantially orthogonal to wire lines of the first wire grid polarizer.

19. The HMD of claim 17, wherein the out-coupling PBS comprises a thin film polarizer that reflects a substantially orthogonal polarization component of the CGI light than the first wire grid polarizer reflects.

20. The HMD of claim 12, wherein the image source comprises:

an illumination module; and a reflective display panel for generating the CGI light in response to illumination by the illumination module, wherein the reflective display panel is disposed on an opposite side of the eyepiece from the illumination module in the illumination region with the in-coupling PBS disposed between the illumination module and the reflective display panel.

21. An eyepiece for a head mounted display, the eyepiece comprising:

an eyepiece frame including an illumination region for receiving computer generated image ("CGI") light into the eyepiece frame and a viewing region to be aligned with an eye of a user;

in-coupling polarization beam splitter ("PBS") supported within the eyepiece frame at the illumination region to re-direct the CGI light to a forward propagation path extending towards the viewing region, wherein the in-coupling PBS comprises a first wire grid polarizer;

an end reflector disposed at an opposite end of the eyepiece frame from the illumination region to reflect the CGI light back along a reverse propagation path within the eyepiece frame, wherein the end reflector comprises a toroidal minor having multiple radiuses of curvatures;

out-coupling PBS supported within the eyepiece frame at the viewing region to pass the CGI light traveling along the forward propagation path and to redirect the CGI light traveling along the reverse propagation path out of an eye-ward side of the eyepiece frame, wherein the out-coupling PBS comprises a thin film polarizer that reflects a substantially orthogonal polarization component of the CGI light than the first wire grid polarizer reflects, wherein the toroidal mirror is disposed in the forward propagation path after the out-coupling PBS; and substantially transparent side sheets mounted to the eyepiece frame to protect the in-coupling PBS and the out-coupling PBS, wherein the transparent side sheets and the eyepiece frame define an air cavity and the forward propagation path extends along within the air cavity, wherein the transparent side sheets pass ambient scene light through an ambient scene side and the eye-ward side of the eyepiece in the viewing region, wherein the out-coupling PBS reflects a substantially orthogonal polarization component of the CGI light than the in-coupling PBS reflects.

22. The eyepiece of claim 21, further comprising:

a polarization rotator disposed in the forward and reverse propagation paths of the CGI light between the out-coupling PBS and the toroidal minor.

23. The eyepiece of claim 21, wherein the eyepiece frame comprises a metal frame including:

elongated members that extend from the illumination region to the viewing region and run substantially parallel to the forward propagation path; and cross members that rigidly hold the elongated members together.

* * * * *